United States Patent [19]

Vanous et al.

[11] Patent Number: 5,172,905
[45] Date of Patent: Dec. 22, 1992

[54] FILM RECEIVE MAGAZINE FOR A LASER IMAGER

[75] Inventors: James C. Vanous, Roseville; Robert L. Rydeen; Thomas J. Lundgren, both of Woodbury; Bert A. Munthe, Marine on St. Croix, all of Minn.; Arnold B. Dammermann, Grand Rapids, Mich.

[73] Assignee: Minnesota Mining and Manufacturing Company, St. Paul, Minn.

[21] Appl. No.: 717,617

[22] Filed: Jun. 19, 1991

[51] Int. Cl.$^5$ ............................................. B65H 31/00
[52] U.S. Cl. ..................................... 271/209; 271/1; 271/207; 271/220; 354/276; 354/281; 378/182; 378/188
[58] Field of Search ............... 271/163, 207, 209, 220, 271/1; 354/276, 281; 378/182, 188

[56] References Cited

U.S. PATENT DOCUMENTS

| 3,743,200 | 7/1973 | Hommerin . | |
|---|---|---|---|
| 3,934,735 | 1/1976 | Schmidt | 378/182 X |
| 3,965,361 | 6/1976 | Reser . | |
| 4,483,014 | 11/1984 | Yuguchi et al. . | |
| 4,516,763 | 5/1985 | Stahl et al. . | |
| 4,553,369 | 11/1985 | Debes et al. . | |
| 4,641,940 | 2/1987 | Muller et al. . | |
| 4,709,913 | 12/1987 | Cagey | 354/281 X |
| 4,781,371 | 11/1988 | Stemmle | 271/209 X |
| 4,836,526 | 6/1989 | Melnik | 271/209 |
| 4,860,042 | 8/1989 | Tajima et al. . | |

FOREIGN PATENT DOCUMENTS

| 137345 | 10/1981 | Japan | 378/182 |
|---|---|---|---|
| 104936 | 6/1985 | Japan | 354/276 |
| 114840 | 6/1985 | Japan | 354/276 |
| 232367 | 11/1985 | Japan | 271/220 |
| 103146 | 5/1986 | Japan | 378/188 |
| 166463 | 7/1986 | Japan | 271/220 |
| 185772 | 8/1988 | Japan | 271/209 |
| 154040 | 6/1989 | Japan | 378/182 |
| 321251 | 12/1989 | Japan | 271/207 |
| 2189331 | 10/1987 | United Kingdom | 354/276 |

OTHER PUBLICATIONS

"Loading and Unloading Film", 3M, pp. II-5 through II 14 7, Feb. 1989.
IPB P831/M952, 3M, pp. 9-202 through 9-203 and 9-32 through 9-33, Jan. 1990.

Primary Examiner—Robert P. Olszewski
Assistant Examiner—Boris Milef
Attorney, Agent, or Firm—Gary L. Griswold; Walter N. Kirn; Walter C. Linder

[57] ABSTRACT

A receive magazine for collecting and transporting sheets of exposed photographic media. The receive magazine includes an elongated, light-tight enclosure having front and back walls, top and bottom walls, and first and second end walls. Sheets of media are gravity fed into the magazine entrance through a collection door on the top wall of the enclosure. The collection door includes a media-receiving slot, a shutter and a spring for biasing the shutter to a normally closed, light-tight position over the slot. A lower downwardly sloping resilient member mounted to the front wall engages the sheets as they are inserted into the magazine and forces the sheets into a vertically stacked arrangement against the back wall of the enclosure, away from the entrance. A ramp surface on the back wall guides sheets being inserted over previously collected sheets. A compound curved surface on the back wall of the enclosure below the ramp surface arcs the sheets to minimize contact during insertion. Collected sheets of media can be removed from the magazine through a retrieve door on the front wall.

18 Claims, 6 Drawing Sheets

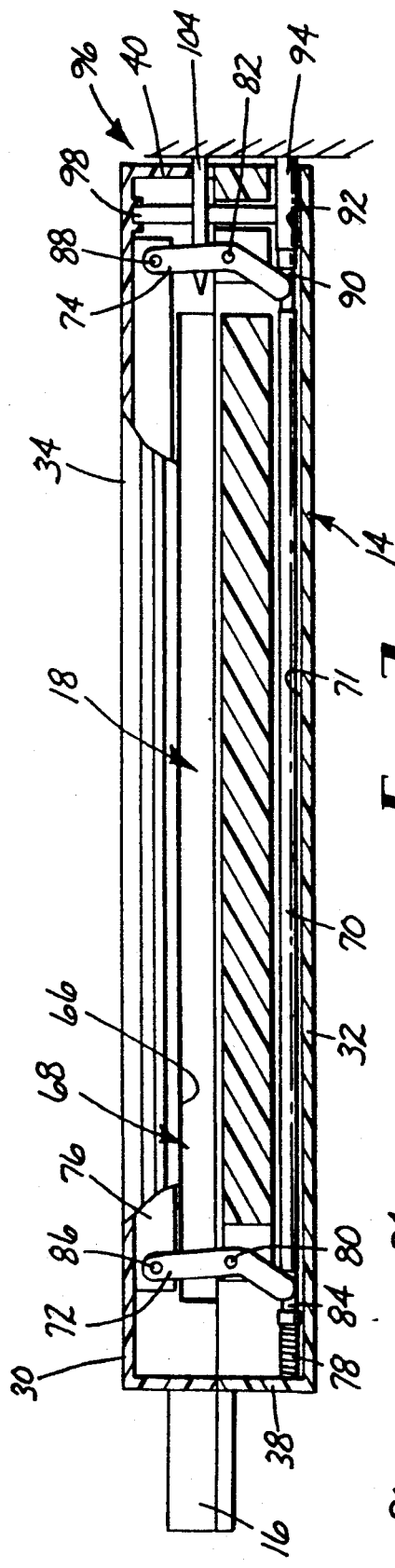
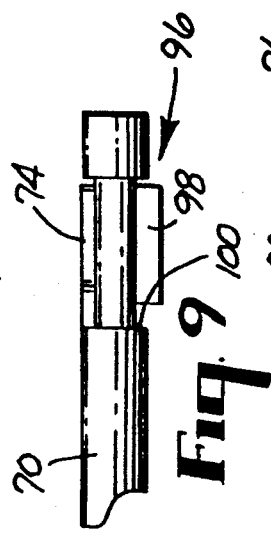
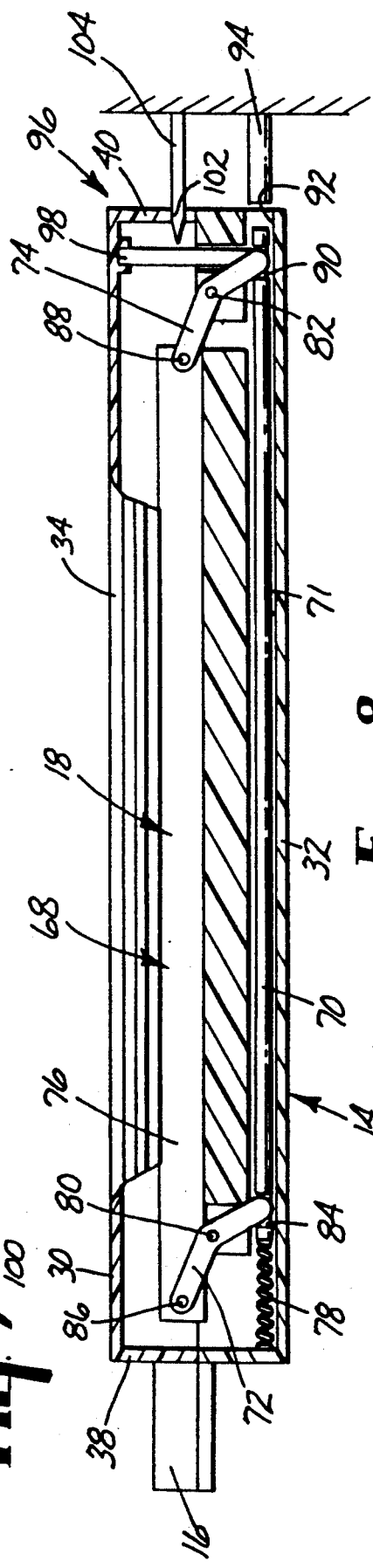

FILM RECEIVE MAGAZINE FOR A LASER IMAGER

FIELD OF THE INVENTION

The present invention relates generally to containers for photosensitive media. In particular, the present invention is a receive magazine for collecting and transporting photographic film imaged by a laser imager.

BACKGROUND OF THE INVENTION

Laser imaging systems are commonly used to produce photographic images from digital image input data generated by magnetic resonance (MR), computed tomography (CT) or other types of scanners. After the film has been imaged in the laser imager, it is typically transported to a developing station by one of two approaches. The first is a mechanical transport system which drives the imaged film to a "docked" processor attached to the laser imager. The second is a light-tight receive magazine for collecting the imaged film within the laser imager. The receive magazine is removed from the laser imager and used to transport the film to the location of the processor.

Commercially available receive magazines used with laser imagers distributed by the 3M Company of St. Paul, Minn., U.S.A., the assignee of the present invention, are relatively expensive and include two rectangular metal sections connected together at one end by hinges. A magazine of this type is loaded into the magazine compartment of the laser imager at a small angle (about 30°) off vertical. The upper section is opened in a clamshell-like manner to permit access to the inside of the magazine. Imaged sheets of film are fed into the opened magazine and dropped into the lower section. A spring-biased plate pivotally mounted to the upper end of the upper magazine section engages the collected sheets of film and secures them in place when the magazine is closed. The laser imager includes mechanisms and associated control systems for opening and closing the receive magazine within the magazine compartment.

The receive magazine described above has a number of drawbacks. The compartment in which the magazine is loaded must be larger than the magazine itself so the magazine can be opened. Sheets of imaged film dropped into the magazine slide on one another. This contact can scratch the film. Film contact during collection can also generate static electricity which causes the sheets of film to cling to one another. It is also configured to receive only 14"×17" film media.

It is evident that there is a continuing need for improved laser imager film receive magazines. Any such magazine should make effective use of space available within the laser imager magazine compartment, and should minimize the amount of potentially detrimental contact between sheets of film being collected. The magazine must also be relatively inexpensive and convenient to use. A magazine capable of receiving different types and sizes of media would also be desirable.

SUMMARY OF THE INVENTION

The present invention is an improved magazine for collecting and transporting sheets of different sizes and types of photosensitive media. The magazine includes a light-tight enclosure having top and bottom walls, front and back walls and end walls. Sheets of media are inserted into an entrance in the magazine through a collection door on the top wall of the enclosure. A first breakaway biasing mechanism engages the sheets of media as the sheets are inserted into the magazine, and guides the collected sheets into a vertically stacked arrangement toward the back wall of the enclosure and away from the entrance. Potentially damaging contact between the sheets of media is minimized.

In one embodiment the first breakaway biasing mechanism includes one or more downwardly sloping resilient members, such as polymer strips, which are mounted to the front wall. A downwardly sloping ramp surface on the back wall guides sheets of media being inserted into the magazine over previously collected sheets. The back wall of the enclosure is curved to arc the sheets of media to facilitate their support.

In another embodiment the collection door includes an elongated media-receiving aperture in the top wall, a shutter, and a biasing mechanism for biasing the shutter to a normally closed position. A retrieval door on the front wall of the enclosure can be used to conveniently remove the collected media from the magazine.

BRIEF DESCRIPTION OF THE DRAWINGS

FIG. 7 is a sectional view of the receive magazine showing the collection door shutter in the open position.

FIG. 8 is a sectional view of the recieve magazine showing the collection door shutter in the closed position.

FIG. 9 is a detailed view of a shutter safety latch mechanism.

DETAILED DESCRIPTION OF THE PREFERRED EMBODIMENTS

Figure 1:
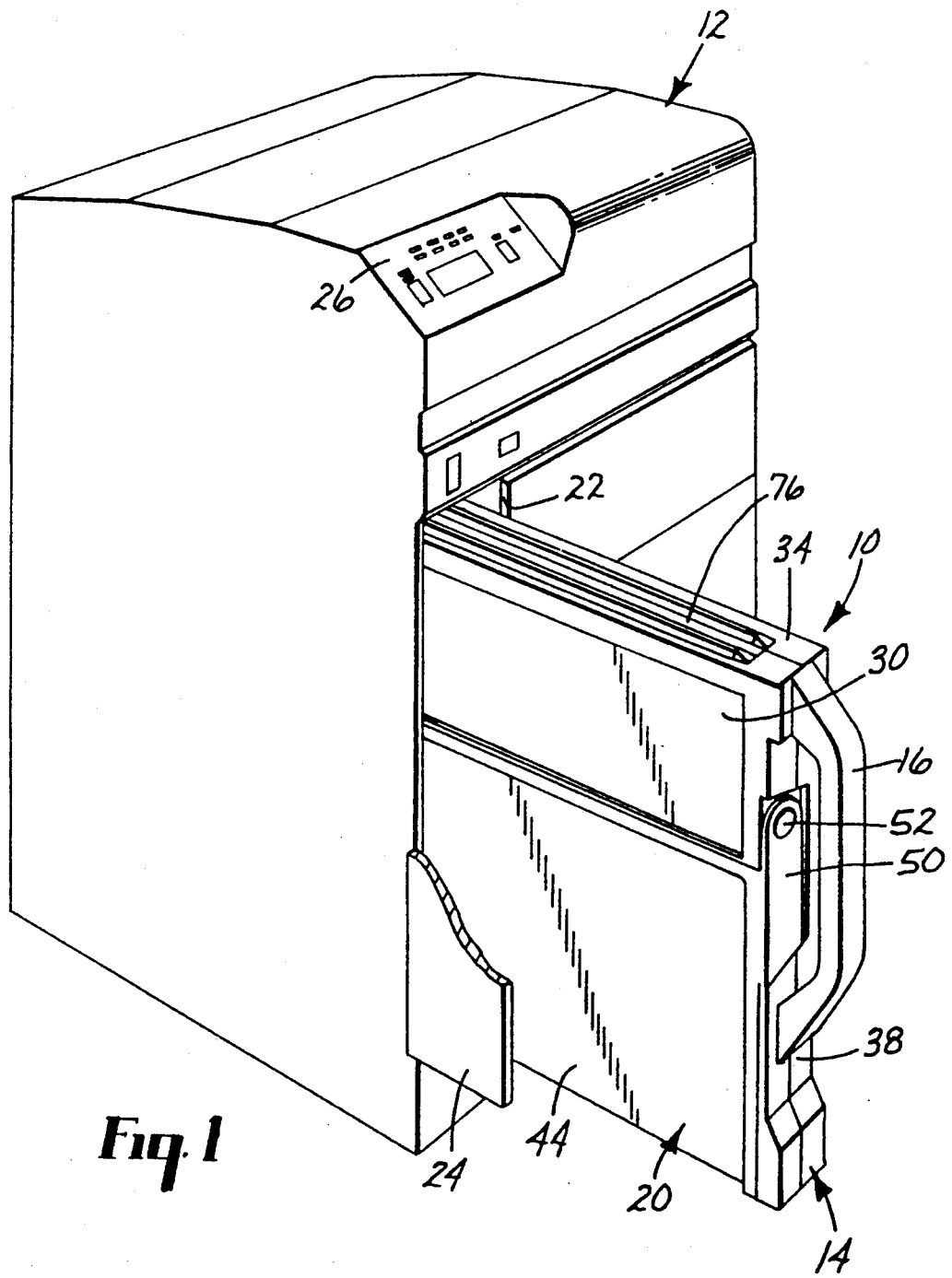
FIG. 1 is an illustration of a film receive magazine in accordance with the present invention partially loaded into a laser imager.
Figure 2:
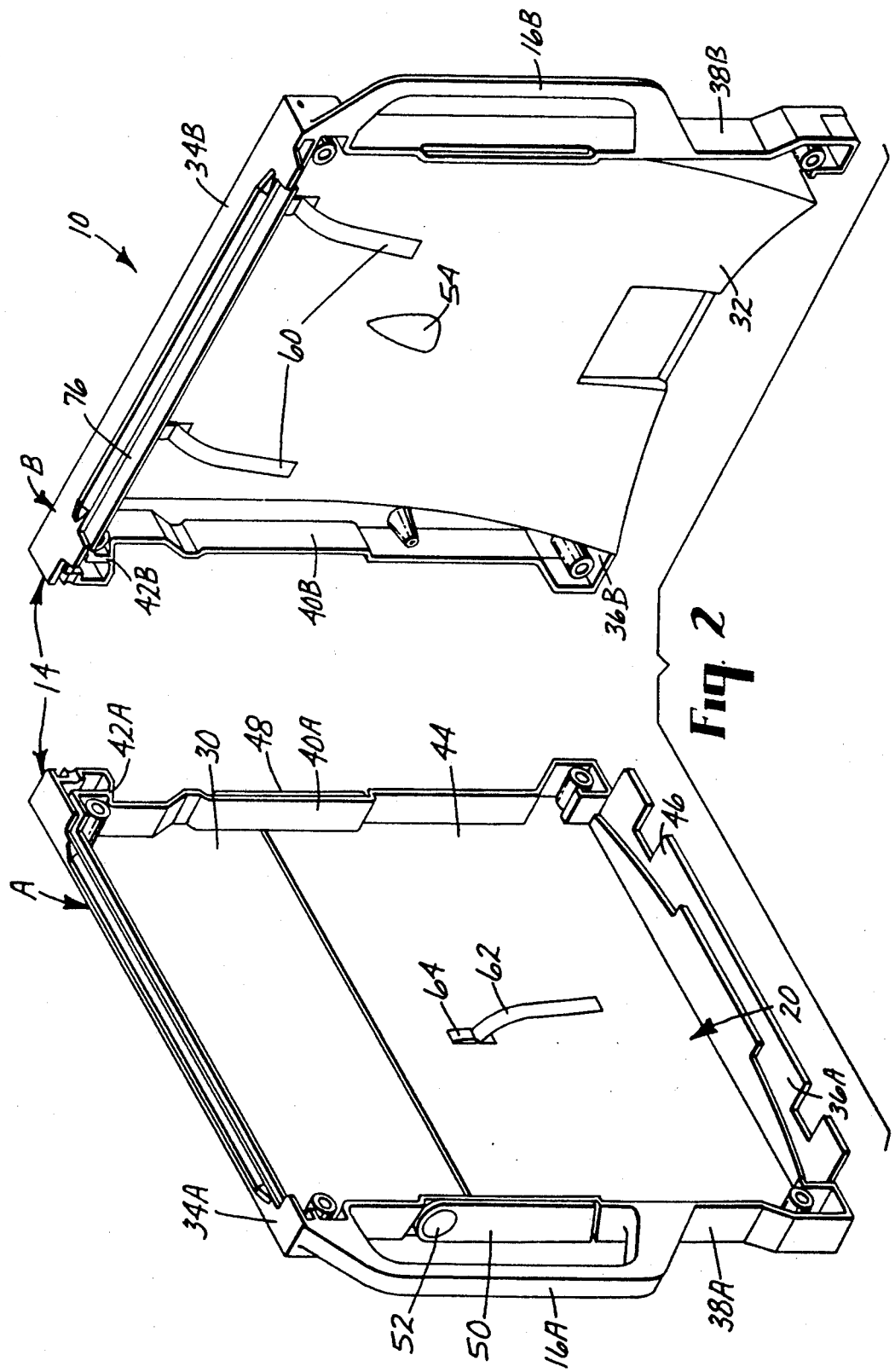
FIG. 2 is an exploded view of the receive magazine shown in FIG. 1.
Figure 3:
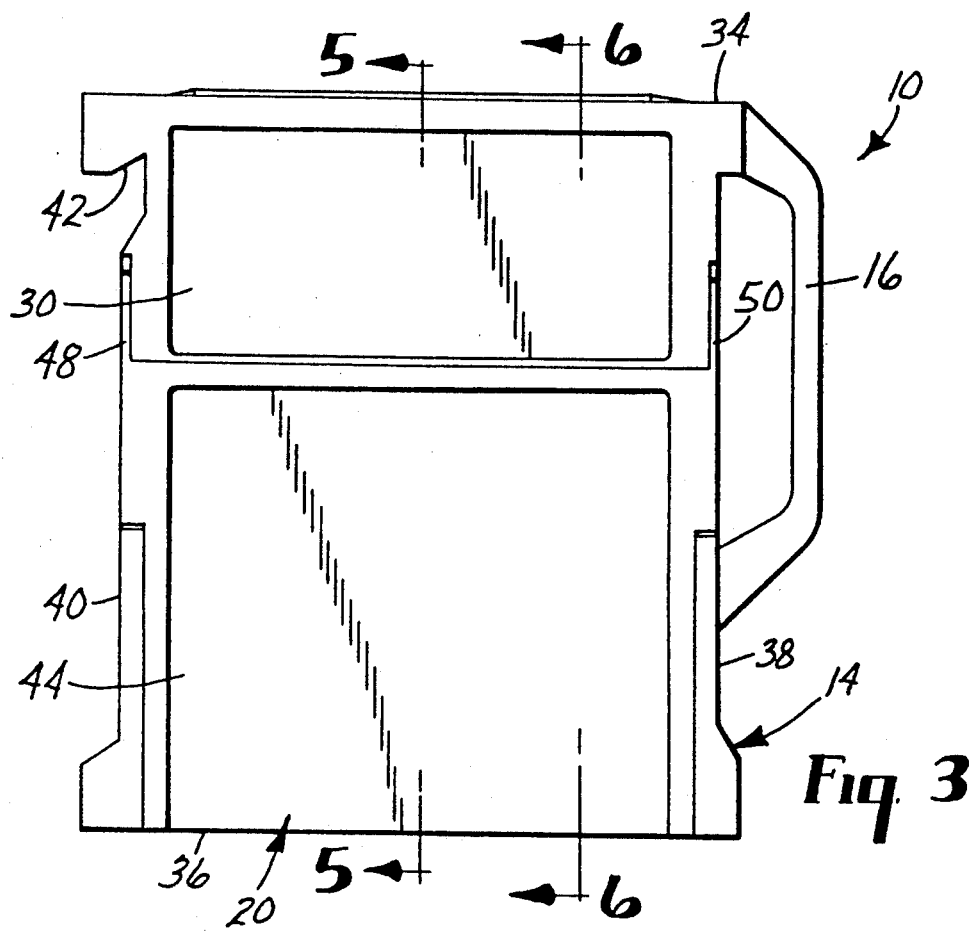
FIG. 3 is a front view of the receive magazine shown in FIG. 1.
Figure 4:
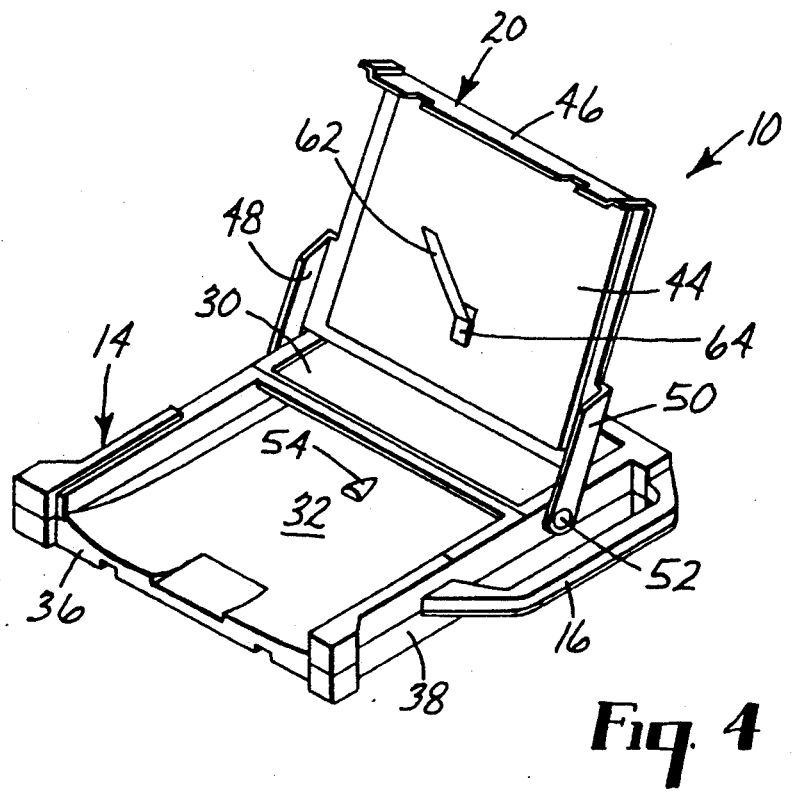
FIG. 4 is a perspective view of the receive magazine showing the film retrieve door in an open position.

A receive magazine 10 in accordance with the present invention is shown partially loaded into a magazine compartment 22 of a laser imager 12 in FIG. 1. Receive magazine 10 is a relatively inexpensive device used to collect, store, and transport sheets of photographic media of varying sizes and types (eg., film or paper) after the media has been imaged by laser imager 12. Magazine 10 includes a light-tight enclosure 14, handle 16, collection door 18 and retrieve door 20. Enclosure 14 has an elongated and relatively narrow footprint, and is manually inserted into magazine compartment 22 in a vertical orientation with the collection door 18 oriented upwardly. Magazine compartment door 24 is closed to provide a light-tight environment for the loaded magazine 10.

Although it is not shown in FIG. 1, laser imager 12 includes an electrical control subsystem with a compartment door closure sensor, compartment door latch and magazine collection door opening mechanism. When magazine 10 is properly loaded and compartment door 24 closed, the imager control subsystem opens magazine collection door 18. Imaged sheets of film are directed to the open collection door 18 whereupon they are gravity fed (ie., free-fall) into an entrance area and drop into enclosure 14. Collected sheets of film are guided to a vertically stacked arrangement (on their lower edges) in a manner which minimizes potentially damaging interference from previously collected sheets. Before compartment door 24 can be opened and receive magazine 10 removed from imager 12, an operator must use control panel 26 to actuate the imager electrical subsystem and close magazine collection door 18. Compartment door 24 can then be opened, and magazine 10 removed from laser imager 12 by means of handle 16. Collected sheets of exposed film are conveniently removed from magazine 10 through the relatively large retrieve door 20.

Receive magazine 10 can be described in greater detail with reference to FIGS. 2-6. Enclosure 14 includes two molded ABS polymer members A and B, and has a front wall 30, back wall 32, top wall 34, bottom wall 36 and end walls 38 and 40. The letters "A" and "B" are used on the reference numerals in FIG. 2 to indicate the portions of walls 34, 36, 38, and 40 and handle 16 on respective enclosure members A and B. Screws or other fasteners can be used to join members A and B. Enclosure 14 is generally vertically oriented in shape and has elongated top and bottom walls 34 and 36 to provide a narrow footprint. The interior surfaces of end walls 38 and 40 are spaced by a sufficient distance to accomodate the width of the largest sheets of film to be collected by magazine 10. Similarly, the distance between the interior surfaces of top wall 34 and bottom wall 36 must be greater than the length of the sheets of film to be collected. The distance between the interior surfaces of front wall 30 and back wall 32 will depend upon the desired capacity of magazine 10. The illustrated embodiment of magazine 10 is configured to hold twenty five or more sheets of film having a maximum width of fourteen inches and a maximum length of eighteen inches. A handle 42 on the top edge of end wall 40 can be used when loading magazine 10 into laser imager 12.

Retrieve door 20 provides a light-tight seal when closed and includes a front panel 44 and a bottom panel 46. In the embodiment shown, front panel 44 forms a substantial portion of front wall 30 and extends fully between end walls 38 and 40. Retrieve door bottom panel 46 similarly forms a substantial portion of the enclosure bottom wall 36. Arms 48 and 50 extend from the opposite sides of panel 46 and are pivotally mounted to end walls 40 and 38, respectively, by pivot mounts 52 (only one of which is visible in FIGS. 1, 2 and 4). Bottom panel 46 frictionally engages the exposed portions of bottom wall 36 on enclosure member B to hold retrieve door 20 in its closed position. When opened, retrieve door 20 swings to an over-center position provides convenient access to sheets of film collected within magazine 10.

The interior or inside surface of back wall 32 is a compound curved surface. As shown in FIGS. 2, 4, 5 and 6, this compound curved surface of wall 32 includes curvature along a first axis extending between end walls 38 and 40, and curvature along a second axis extending between top wall 34 and bottom wall 36. A downwardly and inwardly sloping nose or ramp 54 also extends from the inside surface of back wall 32. The lower edge of ramp 54 is spaced from bottom enclosure wall 36 by a distance greater than the height of shorter sheets of film to be collected in magazine 10. In the illustrated embodiment, ramp 54 is centered between end walls 38 and 40, and positioned approximately 10 inches from bottom wall 36. The portion of the inside surface of back wall 32 between ramp 54 and top wall 34 is generally planar. Below ramp 54, the inside surface of back wall 32 has a radius of curvature of about 24 inches along the second axis (ie., from the ramp downwardly toward bottom wall 36), and about 16 inches along the first axis (ie., between walls 38 and 40).

A pair of breakaway springs 60 extend into enclosure 14 from the inside surface of back wall 32, and are positioned at horizontally spaced locations on the planar portion of the back wall between ramp 54 and top wall 34. Springs 60 are resilient strips of polymer material such as mylar in one embodiment, and are mounted to wall 32 by screws or other fasteners. The polymer strips forming springs 60 extend into enclosure 20 from wall 32 and slope downwardly toward bottom wall 36.

A breakaway spring 62, which can be identical to springs 60, is mounted to the inside surface of receive door 20 midway between end walls 38 and 40 and below ramp 54. The polymer strip which forms spring 62 extends into enclosure 20 and slopes toward bottom wall 36. As perhaps best shown in FIGS. 5 and 6, ramped surfaces 64 are positioned between the mounts of springs 60 and 62 and top wall 34 to guide sheets of film entering magazine 10.

As perhaps best shown in FIGS. 7 and 8, film collection door 18 includes an elongated film-receiving opening or slot 66 through top wall 34, and a shutter 68 for providing an openable and light-tight seal over the opening. Shutter 68 includes pushrod 70, bellcranks 72 and 74, door 76 and spring 78. Pushrod 70 is slidably supported within a groove 71 (shown in FIGS. 5 and 6) in enclosure top wall 34. Bellcrank 72 is rotatably mounted to the inside surface of enclosure top wall 34 by pivot mount 80. One end of bellcrank 72 is slidably engaged within a slot 84 on a first end of pushrod 70 adjacent enclosure end wall 38. The second end of bellcrank 76 is pivotally mounted to a first end of door 76 by means of mount 86. Pivot mount 82 is used to pivotally mount bellcrank 74 to top wall 34 on the side of enclosure 20 adjacent end wall 40. One end of bellcrank 74 is pivotally coupled to a second end of door 76 by mount 88, while the other end of the bellcrank is slidably engaged in a slot 90 on the second end of pushrod 70.

Spring 78 is positioned in groove 71 between end wall 38 and the first end of pushrod 70, and biases the pushrod and bellcranks 72 and 74 in such a manner as to position door 76 over the film-receiving opening 66 in top wall 34. Shutter 68 is shown in its closed position in FIG. 8. The second end of pushrod 70 is aligned with an aperture 92 through end wall 40. When magazine 10 is loaded into laser imager 12, an opening pin 94 is forced into aperture 92 by the electrical subsystem of the laser imager to drive pushrod 70 against the bias force of spring 78 and open the film-receiving opening 66. Shutter 68 is shown in its open position in FIG. 7.

A shutter safety latch mechanism 96 is shown in FIGS. 7-9. Latch mechanism 96 includes leaf spring 98, a slot 100 in pushrod 70 opposite slot 90, and an aperture 102 through enclosure end wall 40. Leaf spring 98 is mounted to front wall 30 in such a manner as to be biased into pushrod slot 100. When engaged in slot 100, spring 98 locks shutter 68 in its closed position to prevent accidental light exposure to any film within magazine 10. When magazine 10 is inserted into imager 12, a fixedly mounted unlocking pin 104 with a tapered tip enters aperture 102 and forces spring 98 downwardly and out of engagement with slot 100. Magazine 10 is held within compartment 22 by a toe plate (not shown) on the floor of the compartment that engages the lower edge of enclosure end wall 38. Opening pin 94 can then be actuated to open and close shutter 68 in the manner described above.

Figure 5:
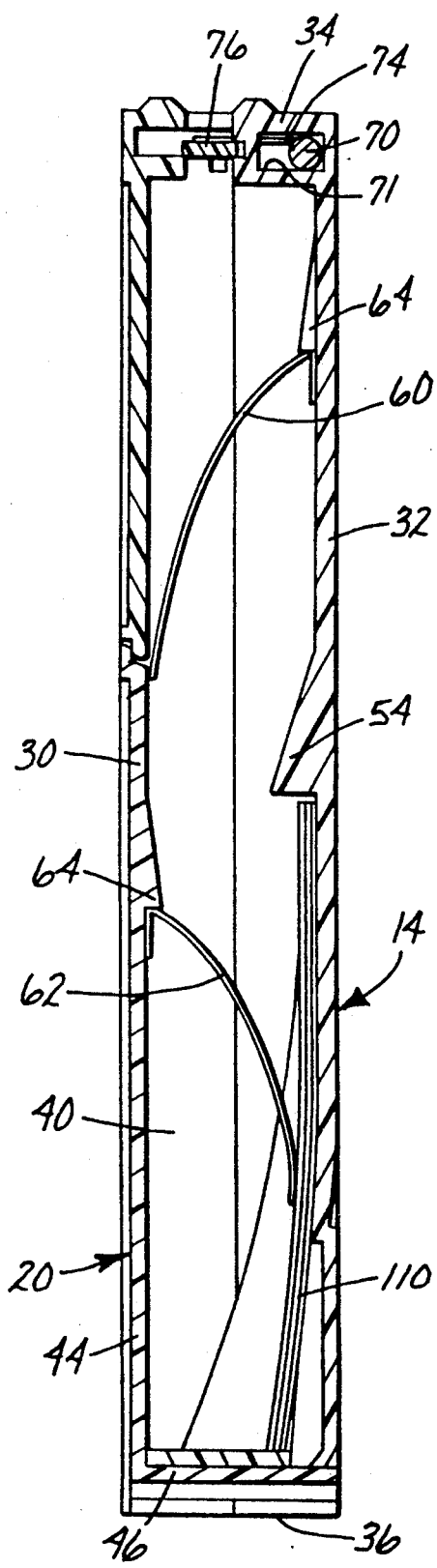
FIG. 5 is a sectional view of the receive magazine taken along line 5—5 in FIG. 3, with several short sheets of film in the magazine.

The manner in which relatively small sheets of media such as film 110 are passively collected and stacked within magazine 10 can be described with reference to FIG. 5. As the sheets of film 110 drop into the entrance of enclosure 14 through opening 66, their lower edges will engage springs 60. Springs 60 slow the fall of sheets of film 100 and guide or force the sheets toward front wall 30. A they continue to fall into enclosure 14, the lower edges of sheets of film 110 engage spring 62 and come to rest on the inside surface of bottom wall 36. The sheets of film 110 are therefore collected away from the enclosure entrance in a vertically stacked arrangement against back wall 32. Spring 62 also causes the stacked sheets of film 110 to at least partially bend and conform to the compound curved inside surface of back wall 32. As a result of this bending and the position of the collected sheets of film 110, only the edges of the sheet of film dropping into enclosure 14 will engage previously collected sheets of film. Minimizing the amount of contact between the sheets of film 110 in this manner reduces the likelihood of scratches and static buildup on the film. Potentially damaging contact between previously collected shorter sheets of film 110 and a sheet being collected is also reduced by ramp 54 which guides the sheet being collected over the previously collected sheets. The curvature of back wall 32 also gives the collected sheets of film 110 "beam strength" rigidity along both perpendicular axes, thereby enabling the sheets to at least partially support their own weight when magazine 10 is loaded in imager 12 and when the magazine is being carried by handle 16.

Figure 6:
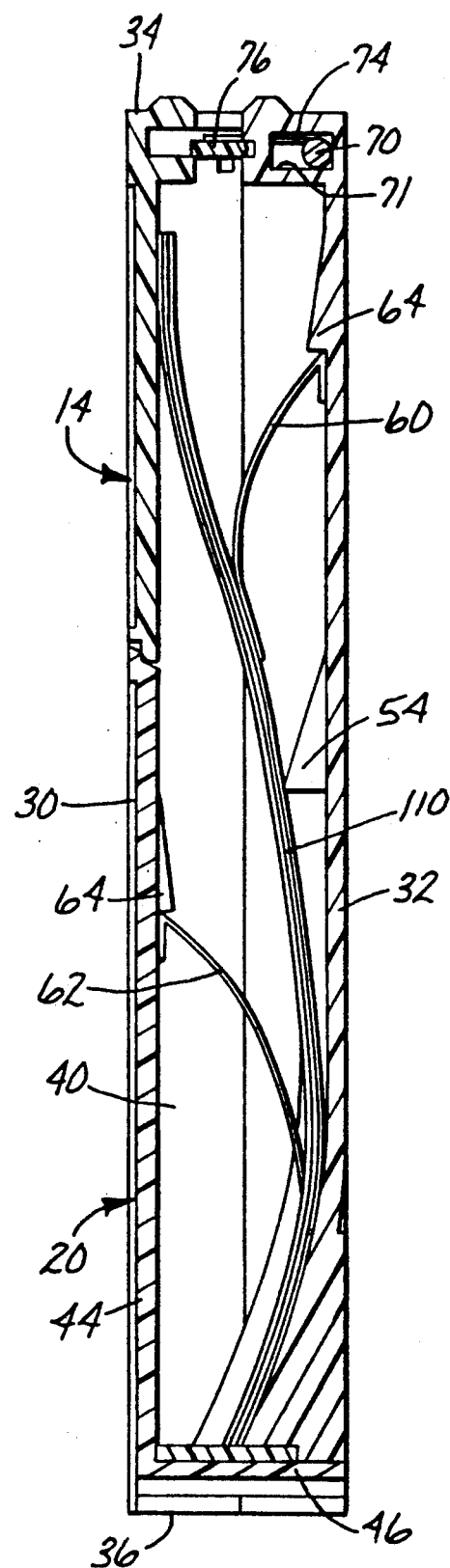
FIG. 6 is a sectional view of the receive magazine taken along line 6—6 in FIG. 3, with several long sheets of film in the magazine.

FIG. 6 illustrates longer sheets of film 110 collected within magazine 10. The longer sheets of film 110 are collected by and supported within magazine 10 in a manner similar to the shorter sheets described above, but extend beyond ramp 54. Springs 60 urge the upper ends of longer sheets of film 110 toward enclosure front wall 30, thereby adding additional rigidity to the sheets when magazine 10 is carried by handle 16.

Figure 10:
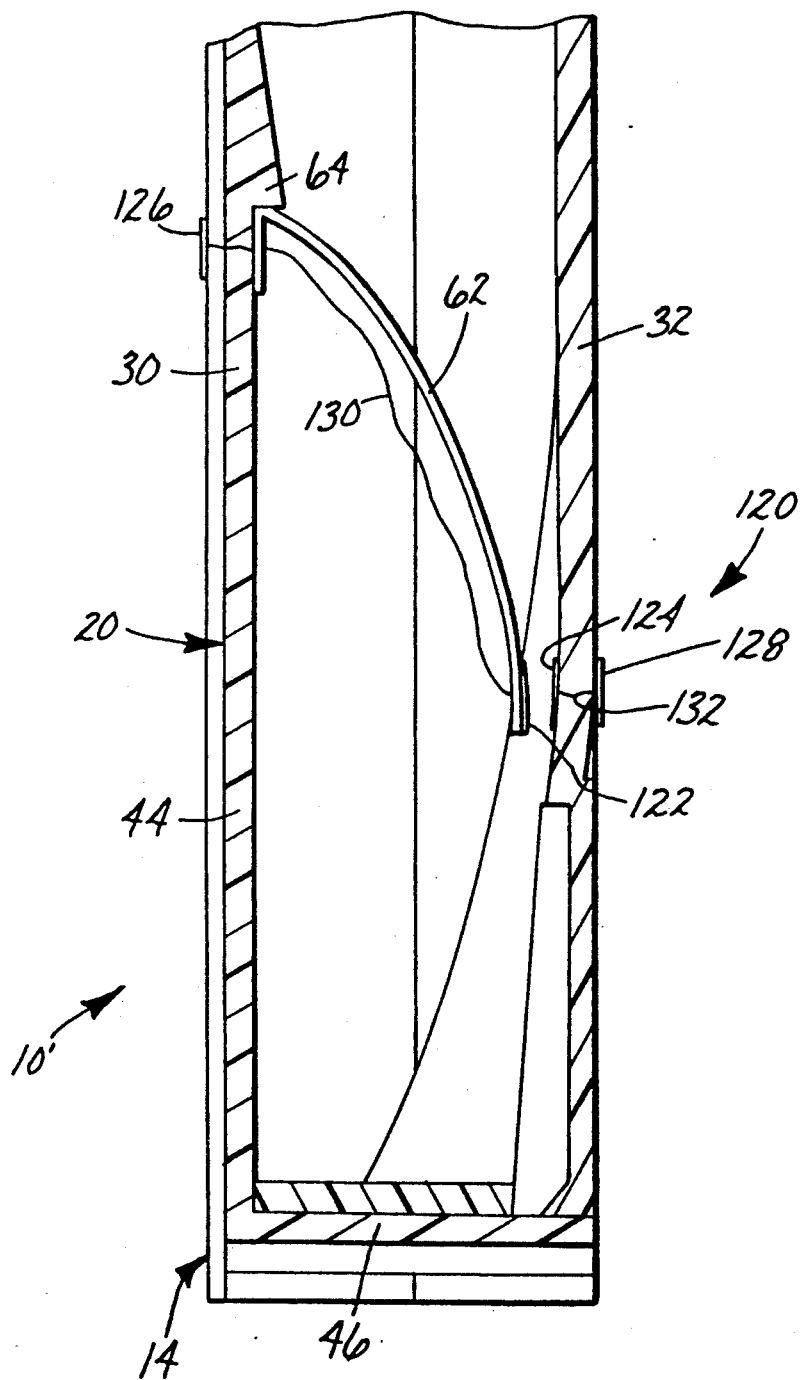
FIG. 10 is a detailed sectional view of a second embodiment of the present invention and illustrating a film sensor.

Magazine 10', a second embodiment of the present invention which includes a sensor 120 for providing electrical signals indicating the presence of collected sheets of film 110, is illustrated in FIG. 10. Elements of magazine 10' which can be identical to those of magazine 10 described above are indicated by common but primed reference numerals (eg., "X'"). Magazine 10' includes a spring 62 having a conductive contact 122 on the side of its free end facing back wall 32. A conductive contact 124 is mounted to the inside surface of back wall 32 adjacent to contact 122. Contacts 122 and 124 are coupled to respective contacts 126 and 128 on the exterior of enclosure 14 by leads 130 and 132. An electric sensing current is applied to sensor 120 through contacts 126 and 128 when magazine 10' is loaded in laser imager 12. If no sheets of film 110 have been collected within magazine 10', spring 62 will force contact 122 into electrical contact with contact 124. Sensor 120 will therefore present a closed circuit when there are no sheets of film within magazine 10'. Any collected sheets of film will cause contacts 122 and 124 to be electrically disconnected. Sensor 120 therefore presents an open circuit whenever any sheets of film have been collected within magazine 10'.

Although the present invention has been described with reference to preferred embodiments, those skilled in the art will recognize that changes may be made in form and detail without departing from the spirit and scope of the invention.

What is claimed is:

1. A magazine configured to be positioned in a generally upright, vertical orientation for passively collecting and transporting a plurality of flexible sheets of photosensitive media, including:
   an elongated, vertically oriented and light-tight enclosure having front and back walls, top and bottom walls, and first and second end walls;
   a collection door on the top wall of the enclosure through which sheets of media are passively received in an entrance within the magazine;
   a first breakaway biasing mechanism for engaging the sheets of media as they are inserted into the magazine; and
   structure on the interior of the enclosure for arcing the collected sheets about a first axis extending between the end walls and about a second axis extending between the top and bottom walls, the first breakaway biasing mechanism and the structure on the interior of the enclosure cooperating to urge collected sheets into a vertically curved and stacked arrangement.

2. The magazine of claim 1 wherein the breakaway biasing mechanism includes one or more downwardly sloping resilient members mounted to the front wall.

3. The magazine of claim 2 wherein the resilient members include strips of polymer material.

4. The magazine of claim 1 and further including a downwardly sloping ramp surface on the back wall of the enclosure, for guiding sheets of media being inserted into the magazine over previously collected sheets.

5. The magazine of claim 4 and further including a mount for mounting the first breakaway biasing mechanism to the front wall between the ramp surface and the bottom wall.

6. The magazine of claim 1 wherein the structure for arcing the collected sheets includes a compound curved inside surface on the back wall.

7. The magazine of claim 1 and further including a second breakaway biasing mechanism between the first breakaway biasing mechanism and the collection door, for engaging the sheets of media as they are inserted into the magazine, and for forcing the sheets toward the front wall of the enclosure.

8. The magazine of claim 7 wherein the second breakaway biasing mechanism includes one or more downwardly sloping resilient members mounted to the back wall.

9. The magazine of claim 8 wherein the resilient members include strips of polymer material.

10. The magazine of claim 1 and further including a retrieve door on the front wall of the enclosure, for removing the sheets of media from the magazine.

11. The magazine of claim 10 and further including a mount for mounting the first breakaway biasing mechanism to an inside surface of the retrieve door.

12. The magazine of claim 1 wherein the collection door includes:
    a media-receiving slot through the top wall;
    a shutter; and
    a biasing mechanism for biasing the shutter to a normally closed position over the slot.

13. The magazine of claim 12 and further including a shutter safety latch for keeping the shutter from being accidentally opened.

14. The magazine of claim 1 and further including a handle on an end wall of the enclosure.

15. A receive magazine for collecting and transporting sheets of photosensitive media, comprising:
    an elongated, light-tight enclosure having front and back walls, top and bottom walls, and end walls;
    a light-tight collection door on the top wall of the enclosure; including:
    a film-receiving slot through the top wall;
    a shutter; and
    a biasing mechanism for biasing the shutter to a normally closed position over the slot;
    a downwardly sloping ramp on the inside surface of the back wall between the top and bottom walls;
    one or more lower downwardly sloping resilient members mounted to the inside surface of the front wall between the ramp and the bottom enclosure wall;
    one or more upper downwardly sloping resilient members mounted to the inside surface of the back wall between the ramp and the collection door;
    structure on the enclosure for arcing the collected sheets of film along an axis extending between the end walls; and
    a light-tight film retrieve door on one of the front and back walls.

16. The receive magazine of claim 15 wherein the structure for arcing the film includes a compound curved surface on the back wall of the enclosure below the ramp.

17. The receive magazine of claim 16 and further including a safety latch mechanism for preventing accidental opening of the collection door.

18. The receive magazine of claim 17 and further including one or more handles on the enclosure.

* * * * *